(12) United States Patent
Hoya et al.

(10) Patent No.: US 6,688,771 B2
(45) Date of Patent: Feb. 10, 2004

(54) RETAINER FOR ROLLING BEARING

(75) Inventors: Shigenori Hoya, Miyota-machi (JP); Sumio Sato, Miyota-machi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/061,173

(22) Filed: Feb. 4, 2002

(65) Prior Publication Data
US 2002/0106139 A1 Aug. 8, 2002

(30) Foreign Application Priority Data
Feb. 6, 2001 (JP) ........................................ 2001-029463

(51) Int. Cl.[7] .............................................. F16C 33/46
(52) U.S. Cl. ........................................ 384/523; 384/527
(58) Field of Search ................................ 384/531, 532, 384/534, 523, 527

(56) References Cited
U.S. PATENT DOCUMENTS 5,590,225 A * 12/1996 Aramaki et al. ............ 384/527
6,332,717 B1 * 12/2001 Oohira et al. ............... 384/470

* cited by examiner

Primary Examiner—Lenard A. Footland
(74) Attorney, Agent, or Firm—Oliff & Berridge, PLC

(57) ABSTRACT

Strength and rigidity are provided to a retainer so as to prevent the retainer from being deformed by force and sliding friction generated by rolling elements thereby preventing occurrence of retainer noise of a rolling bearing and aggravation of NRRO. A retainer is entirely formed of synthetic resin, and a highly elastic synthetic resin is used for the claws which are required to be highly elastic. A part below a boundary L of a body portion is formed of resin with sufficient strength and rigidity to prevent deformation due to force and sliding friction of rolling elements, thus preventing decline in strength of the retainer as a whole which may occur because of the use of resin with high elasticity for the claws. The strength of the retainer as a whole is fully ensured by the body portion, thus improving various functions, contributed by the rolling bearing.

6 Claims, 2 Drawing Sheets

RETAINER FOR ROLLING BEARING

BACKGROUND OF THE INVENTION

1. Field of the Invention

The present invention relates to a retainer for a rolling bearing, and particularly to a retainer for a rolling bearing suitable for supporting rotating member such as hard disk drives, video tape recorders and office automation equipment.

2. Description of the Related Art

As shown in FIG. 2, a ball bearing 10 consists of an inner race 11 and an outer race 12 each having a track surface, and a plurality of balls 5. Each ball 5 is rotatably disposed between the track surfaces of the inner race 11 and the outer race 12 while rotatably retained by a retainer 1. An annular sealing member 13 is arranged at each end of an axial direction.

As shown in FIG. 3, the retainer 1 being an annular body has a plurality of recessed portions 2 disposed at equal spacing and is integrally molded with resin. The recessed portions 2 work for rotatably retaining the balls 5 (refer to FIG. 2) with a pair of claws 3 provided at each of the recessed portions 2 so as to prevent the balls 5 from falling out. Grease reservoirs 4 are arranged between the claws 3 of adjacent recessed portions 2 at a given spacing. The retainer 1 makes it possible to arrange the balls 5 at a given spacing thereby preventing seizure caused by the balls 5 contacting each other.

Since the retainer 1 does not directly support a bearing load, it is not required to use a material having same strength as the material used for the balls 5, the inner race 11, and the outer race 12. However, it is also true that the retainer 1 is in sliding contact with the balls 5, the inner race 11, and the outer race 12. For instance, when the retainer 1 is employed in such a manner that the inner race 11 is rotated while the outer race 12 is still, the balls 5 revolve around the inner race 11 while rotating on its own axis. The retainer 1 receives a driving force from the balls 5 while the balls 5 are in sliding contact with at the recessed portions 2 thereby revolving around the inner race 11 at the same speed as a revolving speed of the balls 5. Accordingly, the retainer 1 is required to be protected from abrasion and seizure, so that it is often made by injection molding using a synthetic resin such as nylon 66.

The retainer 1 molded from such a material can be elastically deformed. Therefore, in the process of injection molding, when a retainer is released from a die after the injected resin therein is solidified, the claws 3, which have an undercut shape to the direction where the retainer is released, are released in such a manner as to be outwardly stretched, namely, a forced pull-out, thereby making possible to simplify the die structure. Moreover, during the assembly of the rolling bearing 10, the ends of the claws 3 of the retainer 1 are outwardly pushed so that the balls 5 can be pushed into the spherical recessed portions 2 to be rotatably supported.

Since above mentioned elements such as easy releasing from the die and easy placement and displacement of the balls 5 from the claws 3 are taken into consideration, the claws 3 are made thin, which leads to the following effects on the rolling bearing 10.

Even though a required clearance is provided between the retainer 1 and the balls 5 or the track races of the inner race 11 and the outer race 12 is filled with grease, a vibration of the retainer 1 is not avoidable generating noise called a retainer noise or vibration. The retainer noise is induced due to the following: (1) self-excited vibration caused by a sliding friction between the balls 5 and the retainer 1; (2) collision between the retainer 1 and the balls 5 due to grease resistance; and so on.

Moreover, a run-out of a revolution frequency of the balls 5 is generated in case each diameter of the balls 5 is different from each other or the balls 5 are not equivalently arranged in the circumferential direction. Thus, when the rolling bearing 10 is rotated, vibration fluctuates resulting in intensifying a non-repetitive run-out (NRRO) causing a minute displacement, which will be the cause of irregular rotation of hard disk drives (HDD), deterioration of characteristics such as NRRO and the like. Used in a high-speed rotation (12,000–15,000 rpm), the thin portion of the retainer 1 tends to be deformed by a centrifugal force from the balls 5, that is, the claws 3 are outwardly stretched giving more space for the balls 5 to move, which increases vibration and the noise of collision between the retainer 1 and the balls 5. Moreover, the balls 5 are largely fluctuated so as to be inequivalently arranged in the circumferential direction aggravating the NRRO.

SUMMARY OF THE INVENTION

The present invention has been made in light of the problems described above, namely, the increase of the retainer noise due to the characteristic of the retainer and the aggravation of the NRRO. It is an object of the present invention to provide a retainer having sufficient strength and rigidity so as not to deform by the centrifugal force as well as sliding friction of the rolling elements while keeping characteristics of an easy release of the retainer from a die and also an easy placement and displacement of the rolling elements, thereby preventing a ball bearing from the retainer noise and the aggravation of the NRRO.

In a retainer for a rolling bearing according to a first aspect of the present invention, the retainer is made of resin, comprising pairs of claws for preventing rolling elements from falling off, the pairs of claws equally spaced at a body portion, characterized in that highly-elastic resin is used for part of the body portion which influences the elasticity of the claws. In the present invention there is provided the retainer having sufficient rigidity at the body portion ensuring not only rigidity required for the retainer for the rolling bearing but also elasticity required for the claws. Furthermore, the rigidity of the whole retainer is ensured by using resin with a high elasticity for the part of the claws influencing the elasticity.

In the retainer for the rolling bearing according to a second aspect of the present invention, the body portion is formed of resin having sufficient strength and rigidity preventing deformation due to centrifugal force and sliding friction of the rolling elements. The part influencing the elasticity of the claws is made of highly-elastic resin so that the retainer is easily released from the die while the rolling elements are easily placed and displaced from the claws. Accordingly, the performance of the rolling bearing can be improved by giving a high elasticity to the claws so as to improve the performance of releasing the retainer from the die or placing and displacing the rolling elements from the claws and by ensuring the strength of the whole retainer with the body portion.

DESCRIPTION OF THE PREFERRED EMBODIMENT

Figure 1:
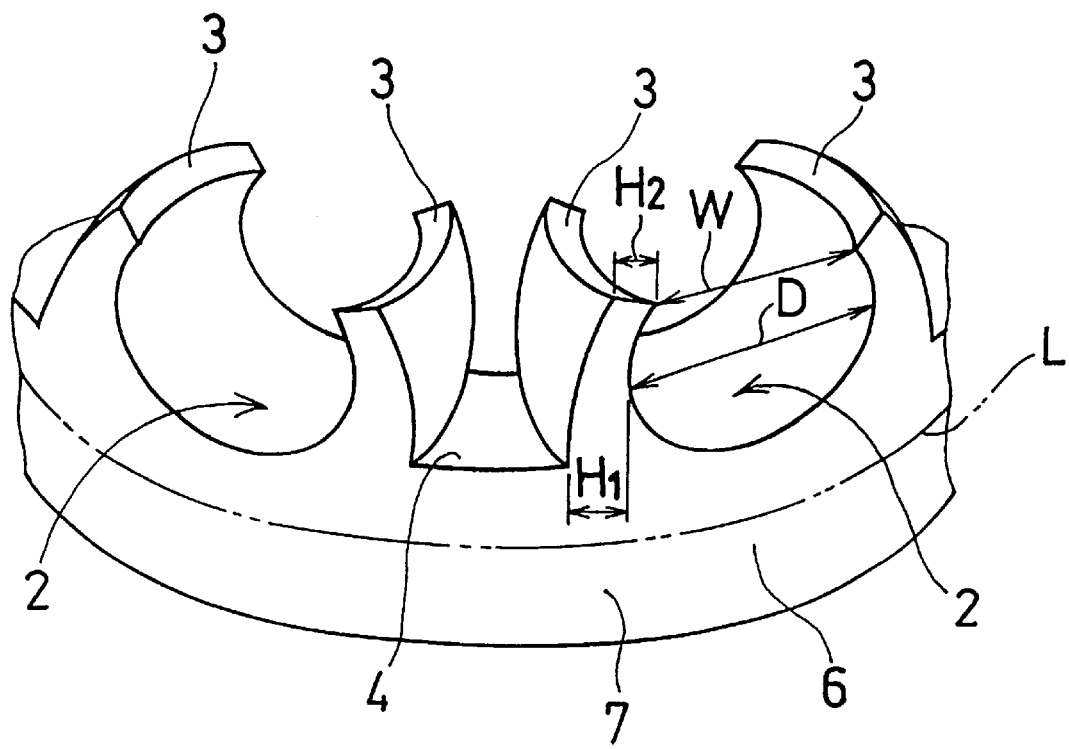
FIG. 1 is a partial view of a ball bearing according to an embodiment of the present invention.

Preferred embodiments of the present invention will be hereinafter explained with reference to the attached drawings. The same reference numerals are used for parts identical with or equivalent to those of a conventional art, and a detailed explanation thereof is omitted herein.

FIG. 1 shows a retainer 6 for a rolling bearing according to an embodiment of the present invention. The retainer 6 is provided with pairs of claws 3 for preventing balls from falling off, which are equally spaced at a body portion 7, and is entirely formed of synthetic resin. In FIG. 1, characteristically different materials are applied at a boundary L indicated in a chain double-dashed line. Herein, the boundary L is provided in the body portion 7, and a portion above the boundary L (hereinafter referred to as "upper boundary") is a part which influences the elasticity of claws 3.

Figure 2:
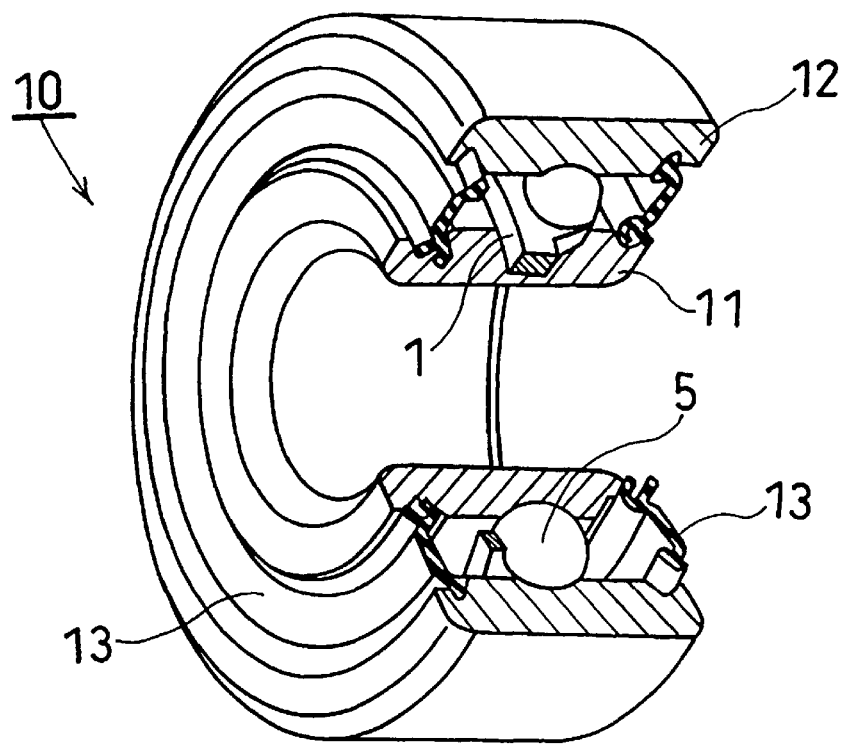
FIG. 2 is a partially cut-away perspective view of a conventional ball bearing.
Figure 3:
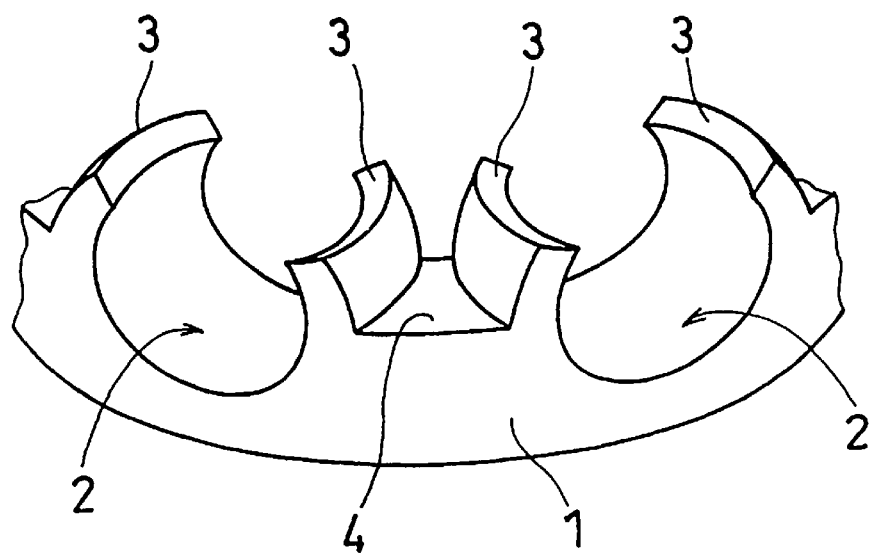
FIG. 3 is a partial view of a retainer of the ball bearing shown in FIG. 2.

While a highly strong and rigid resin is used for the body portion 7, an elastic resin is used for the upper boundary. Specifically, the resin used in the body portion 7 is strong and rigid enough to prevent deformation due to force or sliding friction from balls 5 (refer to FIG. 2). On the other hand, the resin applying in the upper boundary has a high elasticity making possible that the retainer 6 is easily released from the die and the balls 5 are easily placed and displaced from the claws 3. For instance, nylon 66 is used for the upper boundary while nylon 46 is used for the body portion 7. The retainer 6 is manufactured by double molding with an injection molding device. Or, nylon 66 is used for the upper boundary same as above, but nylon 66 mixed with glass fiber by 10 to 50% may be applied for the body portion 7. Note that the number of carbons influence the strength of polyamide resin, for instance, polyamide resin having 12 or more carbons may be used for the upper boundary, and polyamide resin having 10 or less carbons may be used for the body portion 7. Each of the above combination can be selected in consideration that the body portion 7 is required to be made of thermoplastics resin having a higher rigidity than the upper boundary.

According to the preferred embodiment mentioned above, the following can be said. Since a high snapping ability is usually required for the retainer for the ball bearing 10, it is mostly effective to increase the elasticity of the claws 3 so as to allow the retainer to be released from a die by means of a forced pull-out and to allow the balls 5 being easily placed and displaced therefrom. Hence, the retainer 6 according to the embodiment of the present invention is entirely formed of synthetic resin, and the claws 3 needed to be highly elastic is made of synthetic resin with high elasticity.

The part below the boundary L is formed of resin with sufficient strength and rigidity to prevent deformation due to force and sliding friction from the balls 5, thus being able to keep the strength of the retainer 6 as a whole irrespective of that a high elastic resin is used for the claws 3. Moreover, the strength of the retainer 6 as a whole is fully ensured by the body portion 7 thereby improving various functions of the ball bearing 10 contributed by the retainer thus constructed.

Therefore, with the retainer 6 according to the embodiment of the present invention for the ball bearing 10, it is possible to prevent the retainer noise of the ball bearing 10 and the aggravation of the NRRO, and thus to provide a ball bearing suitable for rotation support members of hard disk drives, video tape recorders, office automation equipment, and so on.

Moreover, an example of sizes required to obtain preferable snapping characteristics will be described herein after. For a rolling bearing with an external diameter of 15 mm or less, the clearance between the rolling elements and the recessed portions 2 is about 0.02 to 0.1 mm. When the pocket diameter of the recessed portions 2 and the width between ends of the openings of the claws 3 are D and W, respectively, W is about 0.8 to 0.9 D. When the size of the body portion of the claws 3 and the end portions of the claws 3 are $H_1$ and $H_2$, respectively, $H_2$ is 0.8 to 0.9 $H_1$. Consequently, preferable snapping characteristics can be obtained.

With the present invention thus constructed, it is possible to provide a retainer with sufficient strength and rigidity to prevent deformation due to force and sliding friction from rolling elements without deteriorating the performance of the product being released from the mold and of disposing the rolling elements, and to prevent the retainer noise of a rolling bearing and the aggravation of the NRRO.

What is claimed is:

1. A resin-made retainer for a rolling bearing, comprising pairs of claws and thereby forming a plurality of recessed portions for sustaining rolling elements equally spaced in a circumference at an end surface of an annular body portion, wherein pairs of claws including the plurality of recessed portions are formed with higher elasticity resin than the body portion.

2. The retainer for a rolling bearing according to claim 1, wherein the body portion is formed of resin having sufficient strength and stiffness to prevent deformation due to centrifugal force and sliding friction from the rolling elements; and the pairs of claws including the plurality of recessed portions are formed of resin with higher elasticity than the body portion so as not to deteriorate performance of releasing from a die and to maintain efficiency for placing the rolling elements.

3. The retainer for a rolling bearing according to claim 2, wherein the pairs of claws including the plurality of recessed portions are formed with one of Nylon 66 and polyamide resin having 12 or more carbon atoms, and the body portion is formed with one of Nylon 46, 10% to 50% glass fiber mixed Nylon 66 and polyamide resin having 10 or less carbon atoms.

4. The retainer for a rolling bearing according to claim 1, wherein the pairs of claws including the plurality of recessed portions are formed with one of Nylon 66 and polyamide resin having 12 or more carbon atoms, and the body portion is formed with one of Nylon 46, 10% to 50% glass fiber mixed Nylon 66 and polyamide resin having 10 or less carbon atoms.

5. The retainer for a rolling bearing according to claim 1, wherein a width between ends of openings of the claws is equal to 0.8 to 0.9 times a pocket diameter of the recessed portions.

6. The retainer for a rolling bearing according to claim 1, wherein a size of end portions of the claws is equal to 0.8 to 0.9 times the size of a base portion of the claws.

* * * * *